US008706276B2

(12) United States Patent
Ellis et al.

(10) Patent No.: US 8,706,276 B2
(45) Date of Patent: Apr. 22, 2014

(54) SYSTEMS, METHODS, AND MEDIA FOR IDENTIFYING MATCHING AUDIO

(75) Inventors: Daniel P. W. Ellis, New York, NY (US); Courtenay V. Cotton, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 591 days.

(21) Appl. No.: 12/902,859

(22) Filed: Oct. 12, 2010

(65) Prior Publication Data

US 2011/0087349 A1 Apr. 14, 2011

Related U.S. Application Data

(60) Provisional application No. 61/250,096, filed on Oct. 9, 2009.

(51) Int. Cl.
*G06F 17/00* (2006.01)

(52) U.S. Cl.
USPC .......... 700/94

(58) Field of Classification Search
USPC .......... 700/94; 704/500–504
See application file for complete search history.

(56) References Cited

U.S. PATENT DOCUMENTS 5,918,223 A 6/1999 Blum et al.
6,967,275 B2 11/2005 Ozick
6,990,453 B2 1/2006 Wang et al.
7,174,293 B2 2/2007 Kenyon et al.
7,221,902 B2 5/2007 Kopra et al.
7,277,766 B1 10/2007 Khan et al.
7,359,889 B2 4/2008 Wang et al.
7,516,074 B2 4/2009 Bilobrov
7,616,128 B2 11/2009 Ohno et al.
7,627,477 B2 12/2009 Wang et al.
7,812,241 B2 10/2010 Ellis
2002/0037083 A1 3/2002 Weare et al.
2003/0103523 A1* 6/2003 Frossard et al. .......... 370/465
2005/0091275 A1* 4/2005 Burges et al. .......... 707/104.1
2005/0092165 A1 5/2005 Weare et al.
2006/0004753 A1 1/2006 Coifman et al.
2006/0107823 A1 5/2006 Platt et al.

(Continued)

OTHER PUBLICATIONS

Abe, T. and Honda, M., "Sinusoidal Model Based on Instantaneous Frequency Attractors", In IEEE Transactions in Audio, Speech and Language Processing, vol. 14, No. 4, Jul. 2006, pp. 1292-1300.

(Continued)

*Primary Examiner* — Andrew C Flanders
(74) *Attorney, Agent, or Firm* — Byrne Poh LLP

(57) ABSTRACT

System, methods, and media that: receive a first piece of audio content; identify a first plurality of atoms that describe at least a portion of the first piece of audio content using a Matching Pursuit algorithm; form a first group of atoms from at least a portion of the first plurality of atoms, the first group of atoms having first group parameters; form at least one first hash value for the first group of atoms based on the first group parameters; compare the at least one first hash value with at least one second hash value, wherein the at least one second hash value is based on second group parameters of a second group of atoms associated with a second piece of audio content; and identify a match between the first piece of audio content and the second piece of audio content based on the comparing.

30 Claims, 2 Drawing Sheets

(56) References Cited

U.S. PATENT DOCUMENTS

| | | | | |
|---|---|---|---|---|
| 2006/0155751 | A1 | 7/2006 | Geshwind et al. | |
| 2006/0173692 | A1 | 8/2006 | Rao et al. | |
| 2007/0169613 | A1 | 7/2007 | Kim et al. | |
| 2007/0192087 | A1 | 8/2007 | Kim et al. | |
| 2007/0214133 | A1 | 9/2007 | Liberty et al. | |
| 2007/0276733 | A1 | 11/2007 | Geshwind et al. | |
| 2009/0157391 | A1 | 6/2009 | Bilobrov | |
| 2009/0259633 | A1 * | 10/2009 | Bronstein et al. | 707/3 |
| 2010/0257129 | A1 | 10/2010 | Lyon et al. | |
| 2011/0081082 | A1 | 4/2011 | Jiang et al. | |
| 2011/0087349 | A1 | 4/2011 | Ellis et al. | |

OTHER PUBLICATIONS

Andoni, A. and Indyk, P., "Near-Optimal Hashing Algorithms for Approximate Nearest Neighbor in High Dimensions", In Communications of the ACM, vol. 51, No. 1, 2008, pp. 117-122.

Aucouturier, J.J. and Pachet, F., "Music Similarity Measures: What's the Use?", In Proceedings of the 3rd International Symposium on Music Information Retrieval, Oct. 2002, pp. 157-163.

Bartsch, M.A. and Wakefield, G.H., "To Catch a Chorus: Using Chroma-Based Representations for Audio Thumbnailing", In IEEE Workshop on Applications of Signal Processing to Audio and Acoustics, New Paltz, NY, USA, Oct. 21-24, 2001, pp. 15-18.

Casey, M and Slaney, M., "The Importance of Sequences in Musical Similarity", IEEE International Conference on Acoustics, Speech and Signal Processing (ICASSP 2006), Toulouse, France, May 14-19, 2006, pp. V5-V8.

Casey, M. and Slaney, M., "Fast Recognition of Remixed Music Audio", In IEEE International Conference on Acoustics, Speech and Signal Processing (ICASSP 2007), Apr. 15-20, 2007, pp. IV-1425-1428.

Charpentier, F.J., "Pitch Detection Using Short-Term Phase Spectrum", In IEEE International Conference on Acoustics, Speech, and Signal Processing (ICASSP '86), Tokyo, Japan, vol. 11, Apr. 1986, pp. 113-116.

Chen, S.S. and Gopalakrishnan, P.S., "Speaker, Environment and Channel Change Detection and Clustering via the Bayesian Information Criterion", In Proceedings of the DARPA Broadcast News Transcription and Understanding Workshop, Feb. 1998.

Chu, S., et al., "Environmental Sound Recognition Using MP-Based Features", In IEEE International Conference on Acoustics, Speech and Signal Processing (ICASSP 2008), Mar. 31-Apr. 4, 2008, pp. 1-4.

Cotton, C. and Ellis, D.P.W., "Finding Similar Acoustic Events Using Matching Pursuit and Locality-Sensitive Hashing", In IEEE Workshop on Applications of Signal Processing to Audio and Acoustics, (WASPAA '09), Oct. 18-21, 2009, pp. 125-128.

Cotton, C.V. and Ellis, D.P.W., "Audio Fingerprinting to Identify Multiple Videos of an Event", In IEEE International Conference on Acoustics Speech and Signal Processing (ICASSP), Mar. 14-19, 2010 , pp. 2386-2389.

Desain, P. and Honing, H., "Computational Models of Beat Induction: The Rule-Based Approach", In Journal of New Music Research, vol. 28, No. 1, 1999, pp. 29-42.

Dixon, S., "Automatic Extraction of Tempo and Beat from Expressive Performances", In Journal of New Music Research, vol. 30, No. 1, Mar. 2001, pp. 39-58.

Dixon, S., et al., "Perceptual Smoothness of Tempo in Expressively Performed Music", In Music Perception: An Interdisciplinary Journal, vol. 23, No. 3, Feb. 2006, pp. 195-214.

Downie, J.S., et al., "The 2005 Music Information Retrieval Evaluation Exchange (MIREX 2005): Preliminary Overview", In Proceedings of the 6th International Conference on Music Information Retrieval (ISMIR), London, UK, 2005, pp. 320-323.

Ellis, D., et al., "The "uspop2002" Pop Music Data Set", Technical Report, 2003, available at: http://labrosa.ee.columbia.edu/projects/musicsim/uspop2002.html.

Fujishima, T., "Realtime Chord Recognition of Musical Sound: A System Using Common Lisp Music", In Proceedings of International Computer Music Conference (ICMC), 1999, pp. 464-467.

Gomez, E., "Tonal Description of Polyphonic Audio for Music Content Processing", In INFORMS Journal on Computing, vol. 18, No. 3, Summer 2006, pp. 294-304.

Goto, M. and Muraoka, Y., "A Beat Tracking System for Acoustic Signals of Music", In Proceedings of the Second ACM International Conference on Multimedia, San Francisco, CA, USA, 1994, pp. 365-372.

Gouyon, F., et al., "An Experimental Comparison of Audio Tempo Induction Algorithms", In IEEE Transactions on Audio, Speech, and Language Processing, vol. 14, No. 5, Sep. 2006, pp. 1832-1844.

Gruzd, A.A, et al., "Evalutron 6000: Collecting Music Relevance Judgments", In Proceedings of the 7th ACM/IEEE-CS Joint Conference on Digital Libraries (JCDL '07), Vancouver, British Columbia, Canada, Jun. 17-22, 2007, p. 507.

Heusdens, R., et al., "Sinusoidal Modeling Using Psychoacoustic-Adaptive Matching Pursuits", In IEEEE Signal Processing Letters, vol. 9, No. 8, Aug. 2002, pp. 262-265.

Jehan, T., "Creating Music by Listening", Ph.D. Thesis, MIT Media Lab, Massachusetts Institute of Technology, Cambridge, MA, USA, Sep. 2005.

Klapuri, A., "Sound Onset Detection by Applying Psychoacoustic Knowledge", In IEEE International Conference on Acoustics, Speech, and Signal Processing, vol. 6, Phoenix, Arizona, USA, Mar. 15-19, 1999, pp. 3089-3092.

Krstulovic, S, and Gribonval, R., "MPTK, The Matching Pursuit Toolkit", 2008, available at: http://mptk.irisa.fr/.

Krstulovic, S. and Gribonval, R., "MPTK: Matching Pursuit Made Tractable", In IEEE International Conference on Acoustics, Speech and Signal Processing (ICASSP 2006), Toulouse, France, vol. 3, May 14-16, 2006, pp. III-496-499.

Laroche, J., "Efficient Tempo and Beat Tracking in Audio Recordings", In Journal of the Audio Engineering Society, vol. 51, No. 4, Apr. 2003 pp. 226-233.

Logan, B. and Salomon, A., "A Content-Based Music Similarity Function", Technical Report, Cambridge Research Laboratory, Compaq Computer Corporation, Jun. 2001, pp. 1-14.

Logan, B., "Mel Frequency Cepstral Coefficients for Music Modeling", In Proceedings of the 1st International Symposium on Music Information Retrieval, Plymouth, MA, USA, Oct. 23-25, 2000.

Maddage, N.C., et al., "Content-Based Music Structure Analysis with Applications to Music Semantics Understanding", In Proceedings of the 12th annual ACM international conference on Multimedia (MM '04), Oct. 10-16, 2004, pp. 112-119.

Mallat, S.G. and Zhang, Z., "Matching Pursuits with Time-Frequency Dictionaries", In IEEE Transactions on Signal Processing, vol. 41, No. 12, Dec. 1993, pp. 3397-3415.

Mandel, M.I. and Ellis, D.P.W., "A Web-Based Game for Collecting Music Metadata", In the 8th International Conference on Music Information Retrieval (ISMIR 2007), Vienna, Austria, Sep. 23-27, 2007.

Mandel, M.I. and Ellis, D.P.W., "Song-Level Features and Support Vector Machines for Music Classification", In Proceedings of the 6th International Conference on Music Information Retrieval (ISMIR), Sep. 2005, pp. 594-599.

McKinney, M.F. and Moelants, D., "Ambiguity in Tempo Perception: What Draws Listeners to Different Metrical Levels?", Music Perception, vol. 24, No. 2, Dec. 2006, pp. 155-166.

McKinney, M.F. and Moelants, D., "Audio Beat Tracking from MIREX 2006", Technical Report, Aug. 2, 2007.

McKinney, M.F. and Moelants, D., "Audio Tempo Extraction", Technical Report, Oct. 10, 2005, available at: http://www.music-ir.org/mirex/wiki/2005:Audio_Tempo_Extraction.

McKinney, M.F., et al.,"Evaluation of Audio Beat Tracking and Music Tempo Extraction Algorithms", In Journal of New Music Research, vol. 36, No. 1, 2007, pp. 1-16.

Moelants, D. and McKinney, M.F., "Tempo Perception and Musical Content: What Makes a Piece Fast, Slow or Temporally Ambiguous?", In Proceedings of the 8th International Conference on Music Perception and Cognition (ICMPC8), Evanston IL, USA, Aug. 3-7, 2004, pp. 558-562.

Muller, M., et al., "Audio Matching via Chroma-Based Statistical Features", In Proceedings of the International Conference on Music Information Retrival (ISMIR-05), 2005, pp. 288-295.

(56) References Cited

OTHER PUBLICATIONS

Office Action dated Feb. 6, 2009 in U.S. Appl. No. 11/863,014.
Office Action dated May 30, 2008 in U.S. Appl. No. 11/863,014.
Office Action dated Oct. 28, 2009 in U.S. Appl. No. 11/863,014.
Ogle, J.P. and Ellis, D.P.W, "Fingerprinting to Identify Repeated Sound Events in Long-Duration Personal Audio Recordings", In IEEE International Conference on Acoustics, Speech and Signal Processing (ICASSP 2007), vol. 1, Apr. 15-20, 2007, pp. 233-236.
Pan, D., "A Tutorial on MPEG/Audio Compression", In IEEE Multimedia, vol. 2, No. 2, Summer 1995, pp. 60-74.
Peeters, G., "Template-Based Estimation of Time-Varying Tempo", In EURASIP Journal on Advances in Signal Processing, vol. 2007, No. 1, Jan. 1, 2007, pp. 1-14.
Petitcolas, F., "MPEG for MATLAB", Dec. 14, 2008, available at: http://www.petitcolas.net/fabien/software/mpeg.
Rauber, A., et al., "Using Psycho-Acoustic Models and Self-Organizing Maps to Create a Hierarchical Structuring of Music by Sound Similarity", In Proceedings of the 3rd International Conference on Music Information Retrieval (ISMIR 2002), Paris, France, 2002, pp. 13-17.
Tsai, W.H., et al., "A Query-by-Example Technique for Retrieving Cover Versions of Popular Songs with Similar Melodies", In Proceedings of the 6th International Conference on Music Information Retrieval (ISMIR 2005), London, UK, Sep. 11-15, 2005, pp. 183-190.
U.S. Appl. No. 11/863,014, filed Sep. 27, 2007.
U.S. Appl. No. 60/847,529, filed Sep. 27, 2006.
U.S. Appl. No. 60/582,242, filed Jun. 23, 2004.
U.S. Appl. No. 60/610,841, filed Sep. 17, 2004.
U.S. Appl. No. 60/799,973, filed May 12, 2006.
U.S. Appl. No. 60/799,974, filed May 12, 2006.
U.S. Appl. No. 60/811,692, filed Jun. 7, 2006.
U.S. Appl. No. 60/811,713, filed Jun. 7, 2006.
U.S. Appl. No. 60/855,716, filed Oct. 31, 2006.
U.S. Appl. No. 61/250,096, filed Oct. 9, 2009.
Wang, A., "The Shazam Music Recognition Service", In Communications of the ACM, vol. 49, No. 8, Aug. 2006, pp. 44-48.
Amigó, E., et al., "A Comparison of Extrinsic Clustering Evaluation Metrics Based on Formal Constraints", In Information Retrieval, vol. 12, No. 4, Aug. 2009, pp. 461-486.
Ballan, L., et al., "Unstructured Video-Based Rendering: Interactive Exploration of Casually Captured Videos", In ACM Transactions on Graphics (TOG), vol. 29, No. 4, Jul. 2010.
Becker, H., et al., "Identifying Content for Planned Events Across Social Media Sites", In Proceedings of the 5th ACM International Conference on Web Search and Web Data Mining (WSDM '12), Seattle, WA, US, Feb. 8-12, 2012, pp. 533-542.
Bertin-Mahieux, T. and Ellis, D.P.W., "Large-Scale Cover Song Recognition Using Hashed Chroma Landmarks", In Proceedings of the IEEE Workshop on Applications of Signal Processing to Audio and Acoustics (WASPAA '11), New Paltz, NY, US, Oct. 16-19, 2011, pp. 117-120.
Bertin-Mahieux, T., et al., "Clustering Beat-Chroma Patterns in a Large Music Database", In Proceedings of the 11th International Society for Music Information Retrieval Conference (ISMIR 10), Utrecht, NL, Aug. 9-13, 2010, pp. 111-116.
Bertin-Mahieux, T., et al., "Evaluating Music Sequence Models through Missing Data", In Proceedings of the IEEE International Conference on Acoustics, Speech, and Signal Processing (ICASSP 11), Prague, CZ, May 22-27, 2011, pp. 177-180.
Bertin-Mahieux, T., et al., "The Million Song Dataset", In Proceedings of the 12th International Society for Music Infomation Retrieval Conference (ISMIR '11), Miami, FL, US, Oct. 24-28, 2011, pp. 591-596.
Beskow, J., et al., "Hearing at Home—Communication Support in Home Environments for Hearing Impaired Persons", In Proceedings of the 9th Annual Conference of the International Speech Communication Association (INTERSPEECH '08), Brisbane, AU, Sep. 22-26, 2008, pp. 2203-2206.
Blunsom, P., "Hidden Markov Models", Technical Report, University of Melbourne, Aug. 19, 2004, available at: http://digital.cs.usu.edu/~cyan/CS7960/hmm-tutorial.pdf.
Buchler, M., et al., "Sound Classification in Hearing Aids Inspired by Auditory Scene Analysis", In EURASIP Journal on Applied Signal Processing, vol. 2005, No. 18, Jan. 1, 2005, pp. 2991-3002.
Cotton, C.V. and Ellis, D.P.W., "Spectral vs. Spectro-Temporal Features for Acoustic Event Detection", In Proceedings of the IEEE Workshop on Applications of Signal Processing to Audio and Acoustics IEEE Workshop on Applications of Signal Processing to Audio and Acoustics (WASPAA '11), New Paltz, NY, US, Oct. 16-19, 2011, pp. 69-72.
Cotton, C.V., et al., "Soundtrack Classification by Transient Events", In Proceedings of the IEEE International Conference on Acoustics, Speech, and Signal Processing (ICASSP '11), Prague, CZ, May 22-27, 2011, pp. 473-476.
Doherty, A.R., et al., "Multimodal Segmentation of Lifelog Data", In Proceedings of the 8th International Conference on Computer-Assisted Information Retrieval (RIAO '07), Pittsburgh, PA, US, May 30-Jun. 1, 2007, pp. 21-38.
Downie, J.S., "The Music Information Retrieval Evaluation Exchange (2005-2007): A Window into Music Information Retrieval Research", In Acoustical Science and Technology, vol. 29, No. 4, 2008, pp. 247-255.
Eck, D., et al., "Automatic Generation of Social Tags for Music Recommendation", In Proceedings of the 21st Annual Conference on Neural Information Processing Systems (NIPS '07), Vancouver, BC, CA, Dec. 3-6, 2007, pp. 1272-1279.
Ellis, D.P.W. and Lee, K., "Accessing Minimal-Impact Personal Audio Archives", In IEEE MultiMedia, vol. 13, No. 4, Oct.-Dec. 2006, pp. 30-38.
Ellis, D.P.W. and Lee, K., "Features for Segmenting and Classifying Long-Duration Recordings of 'Personal' Audio", In Proceedings of the ISCA Tutorial and Research Workshop on Statistical and Perceptual Audio Processing (SAPA '04), Jeju, KR, Oct. 3, 2004.
Ellis, D.P.W. and Poliner, G.E., "Identifying 'Cover Songs' with Chroma Features and Dynamic Programming Beat Tracking", In Proceedings of the IEEE International Conference on Acoustics, Speech, and Signal Processing (ICASSP '07), Honolulu, HI, US, Apr. 15-20, 2007, pp. IV1429-IV1432.
Ellis, D.P.W., "Classifying Music Audio with Timbral and Chroma Features", In Proceedings of the 8th International Conference on Music Information Retrieval (ISMIR D7), Vienna, AT, Sep. 23-27, 2007, pp. 339-340.
Ellis, D.P.W., "Detecting Alarm Sounds", In Proceedings of the Consistent & Reliable Acoustic Cues for Sound Analysis Workshop (CRAC '01), Aalborg, DK, Sep. 2, 2001, pp. 59-62.
Ellis, D.P.W., "Robust Landmark-Based Audio Fingerprinting", Technical Report, LabROSA, Columbia University, May 14, 2012, available at: http://labrosa.ee.columbia.edu/matlab/fingerprint/.
Foote, J., "An Overview of Audio Information Retrieval", In Multimedia Systems, vol. 7, No. 1, Jan. 1999, pp. 2-10.
Ho-Ching, F.W.L., et al., "Can You See What I Hear? The Design and Evaluation of a Peripheral Sound Display for the Deaf", In Proceedings of the Conference on Human Factors in Computing System (CHI '03), Ft. Lauderdale, FL, US, Apr. 5-10, 2003, pp. 161-168.
Hu, N., et al., "Polyphonic Audio Matching and Alignment for Music Retrieval", In Proceedings of the IEEE Workshop on Applications of Signal Processing to Audio and Acoustics (WASPAA '03), New Paltz, NY, US, Oct. 19-22, 2003, pp. 185-188.
Izmirli, Ö. and Dannenberg, R.B., "Understanding Features and Distance Functions for Music Sequence Alignment", In Proceedings of the 11th International Society for Music Information Retrieval Conference (ISMIR '10), Utrecht, NL, Aug. 9-13, 2010, pp. 411-416.
Jiang, N., et al., "Analyzing Chroma Feature Types for Automated Chord Recognition", In Proceedings of the AES 42nd International Conference, Ilmenau, DE, Jul. 22-24, 2011, pp. 285-294.
Jiang, Y.G., et al., "Consumer Video Understanding: A Benchmark Database and An Evaluation of Human and Machine Performance", In Proceedings of the 1st International Conference on Multimedia Retrieval (ICMR '11), Trento, IT, Apr. 18-20, 2011.
Kennedy, L.S. and Naaman, M., "Less Talk, More Rock: Automated Organization of Community-Contributed Collections of Concert

(56) References Cited

OTHER PUBLICATIONS

Videos", In Proceedings of the 18th International Conference on World Wide Web (WWW '09), Madrid, ES, Apr. 20-24, 2009, pp. 311-320.
Ketabdar, H. and Polzehl, T., "Tactile and Visual Alerts for Deaf People by Mobile Phones", In Proceedings of the 11th International ACM SIGACCESS Conference on Computers and Accessibility (ASSETS '09), Pittsburgh, PA, US, Oct. 25-28, 2009, pp. 253-254.
Kim, S. and Narayanan, S., "Dynamic Chroma Feature Vectors with Applications to Cover Song Identification", In Proceedings of the IEEE 10th Workshop on Multimedia Signal Processing (MMSP '08), Cairns, QLD, AU, Oct. 8-10, 2008, pp. 984-987.
Kurth, F. and Muller, M., "Efficient Index-Based Audio Matching", In IEEE Transactions on Audio, Speech, and Language Processing, vol. 16, No. 2, Feb. 2008, pp. 382-395.
Lee, K., et al., "Detecting Local Semantic Concepts in Environmental Sounds Using Markov Model Based Clustering", In Proceedings of the IEEE International Conference on Acoustics, Speech, and Signal Processing (ICASSP '10), Dallas, TX, US, Mar. 14-19, 2010, pp. 2278-2281.
Liu, X., et al., "Finding Media Illustrating Events", In Proceedings of the 1st International Conference on Multimedia Retrieval (ICMR '11), Trento, IT, Apr. 18-20, 2011.
Lu, H., et al., "SoundSense: Scalable Sound Sensing for People-Centric Applications on Mobile Phones", In Proceedings of the 7th International Conference on Mobile Systems, Applications, and Services (MobiSys '09), Krakow, PL, Jun. 22-25, 2009, pp. 165-178.
Manjoo, F., "That Tune, Named", Slate, Oct. 19, 2009, available at: http://www.slate.com/articles/technology/technology/2009/10/that_tune_named.html.
Matthews, S.C., et al., "Scribe4Me: Evaluating a Mobile Sound Transcription Tool for the Deaf", In Proceedings of the 8th International Conference on Ubiquitous Computing (UbiComp '06), Orange County, CA, US, Sep. 17-21, 2006, pp. 159-176.
Miotto, R., and Orio, N., "A Music Identification System Based on Chroma Indexing and Statistical Modeling", In Proceedings of the 9th International Conference on Music Information Retrieval (ISMIR '08), Philadelphia, PA, US, Sep. 14-18, 2008, pp. 301-306.
Miotto, R., et al., "Content-Based Cover Song Identification in Music Digital Libraries", In Proceedings of the 6th Italian Research Conference (IRCDL '10), Padua, IT, Jan. 28-29, 2010, pp. 195-204.
Ng, A.Y., et al., "On Spectral Clustering: Analysis and an Algorithm", In Proceedings of Advances in Neural Information Processing Systems (NIPS '01), Vancouver, BC, CA, Dec. 3-8, 2001, pp. 849-856.
Nordqvist, P. and Leijon, A., "An Efficient Robust Sound Classification Algorithm for Hearing Aids", In Journal of the Acoustical Society of America, vol. 115, No. 6, 2004, pp. 3033-3041.
Orio, N., et al., "Musiclef: A Benchmark Activity in Multimodal Music Information Retrieval", In Proceedings of the 12th International Society for Music Information Retrieval Conference (ISMIR '11), Miami, FL, US, Oct. 24-28, 2011, pp. 603-608.
Oudre, L., et al, "Chord Recognition by Fitting Rescaled Chroma Vectors to Chord Templates", In IEEE Transactions on Audio, Speech and Language Processing, vol. 19, No. 7, Sep. 2011, pp. 2222-2233.
Richards, J., et al., "Tap Tap App for Deaf", available at: http://www.taptap.biz/.
Ryynänen, M. and Klapuri, A., "Query by Humming of Midi and Audio using Locality Sensitive Hashing", In Proceedings of the IEEE International Conference on Acoustics, Speech, and Signal Processing (ICASSP '08), Las Vegas, NV, US, Mar. 30-Apr. 4, 2008, pp. 2249-2252.
Saunders, J., "Real-Time Discrimination of Broadcast Speech/Music", In Proceedings of the IEEE International Conference on Acoustics, Speech, and Signal Processing (ICASSP '96), vol. 2, Atlanta, GA, US, May 7-10, 1996, pp. 993-996.
Scheirer, E. and Slaney, M., "Construction and Evaluation of a Robust Multifeature Music/Speech Discriminator", In Proceedings of the IEEE International Conference on Acoustics, Speech and Signal Processing (ICASSP '97), vol. 2, Munich, DE, Apr. 21-24, 1997, pp. 1331-1334.
Serrà Julià, J., "Identification of Versions of the Same Musical Composition by Processing Audio Descriptions", PhD Dissertation, Universitat Pompeu Fabra, 2011, pp. 1-154.
Serrà, J., et al., "Chroma Binary Similarity and Local Alignment Applied to Cover Song Identification", In IEEE Transactions on Audio, Speech and Language Processing, vol. 16, No. 6, Aug. 2008, pp. 1138-1151.
Serrà, J., et al., "Predictability of Music Descriptor Time Series and its Application to Cover Song Detection", In IEEE Transactions on Audio, Speech, and Langauge Processing, vol. 20, No. 2, Feb. 2012, pp. 514-525.
Sheh, A. and Ellis, D.P.W., "Chord Segmentation and Recognition Using EM-Trained Hidden Markov Models", In Proceedings of the 4th International Conference on Music Information Retrieval (ISMIR '03), Baltimore, MD, US, Oct. 27-30, 2003.
Shrestha, M., et al., "Synchronization of Multi-Camera Video Recordings Based on Audio", In Proceedings of the 15th International Conference on Multimedia (MM '07), Augsburg, DE, Sep. 24-29, 2007, pp. 545-548.
Shrestha, P., "Automatic Mashup Generation from Multiple-Camera Concert Recordings", In Proceedings of the 18th International Conference on Multimedia (MM '10), Firenze, IT, Oct. 25-29, 2010, pp. 541-550.
Snoek, C.G.M., et al., "Crowdsourcing Rock N' Roll Multimedia Retrieval", In Proceedings of the 18th International Conference on Multimedia (MM '10), Firenze, IT, Oct. 25-29, 2010, pp. 1535-1538.
Strehl, A. and Ghosh, J., "Cluster Ensembles—A Knowledge Reuse Framework for Combining Multiple Partitions", In Journal of Machine Learning Research, vol. 3, Dec. 2002, pp. 583-617.
Temko, A., et al., "Acoustic Event Detection and Classification in Smart-Room Environments: Evaluation of CHIL Project Systems", In Proceedings of the 4th Conference on Speech Technology, Zaragoza, ES, Nov. 8-10, 2006.
Tzanetakis, G., et al., "Pitch Histograms in Audio and Symbolic Music Information Retrieval", In Journal of New Music Research, vol. 32, No. 2, Jun. 2003, pp. 143-152.
U.S. Appl. No. 13/624,532, filed Sep. 21, 2012.
U.S. Appl. No. 13/646,580, filed Oct. 5, 2012.
U.S. Appl. No. 60/697,069, filed Jul. 5, 2005.
U.S. Appl. No. 61/537,550, filed Sep. 21, 2011.
U.S. Appl. No. 61/543,739, filed Oct. 5, 2011.
U.S. Appl. No. 61/603,382, filed Feb. 27, 2012.
U.S. Appl. No. 61/603,472, filed Feb. 27, 2012.
Wallace, G.K., "The JPEG Still Picture Compression Standard", In Communications of the ACM, vol. 34, No. 4, Apr. 1991, pp. 30-44.
Wang, A.L.C., "An Industrial Strength Audio Search Algorithm", In Proceedings of the 4th International Conference on Music Information Retrieval (ISMIR '03), Baltimore, MD, US, Oct. 26-30, 2003.
Weiss, R.J. and Bello, J.P., "Identifying Repeated Patterns in Music Using Sparse Convolutive Non-Negative Matrix Factorization", In Proceedings of the 11th International Society for Music Information Retrieval Conference (ISMIR '10), Utrecht, NL, Aug. 9-13, 2010, pp. 123-128.
White, S., "Audiowiz: Nearly Real-Time Audio Transcriptions", In Proceedings of the 12th International ACM SIGACCESS Conference on Computers and Accessibility (ASSETS '10), Orlando, FL, US, Oct. 25-27, 2010, pp. 307-308.
Wold, E., et al., "Content-Based Classification, Search, and Retrieval of Audio", In IEEE Multimedia, vol. 3, No. 3, Fall 1996, pp. 27-36.
Wu, X., et al., "A Top-Down Approach to Melody Match in Pitch Contour for Query by Humming", In Proceedings of the International Symposium on Chinese Spoken Language Processing (ISCSLP '06), Kent Ridge, SG, Dec. 13-16, 2006.
Yegulalp, S., "Speech Recognition: Your Smartphone gets Smarter", Computerworld, Mar. 16, 2011, available at: http://www.computerworld.com/s/article/9213925/Speech$_{13}$ recognition_Your_smartphone_gets_smarter.

(56) References Cited

OTHER PUBLICATIONS

Yu, Y., et al., “Local Summarization and Multi-Level LSH for Retrieving Multi-Variant Audio Tracks”, In Proceedings of the 17th International Conference on Multimedia (MM ’09), Beijing, CN, Oct. 19-24, 2009, pp. 341-350.

Zhang, T. and Kuo, C.C.J., “Audio Content Analysis for Online Audiovisual Data Segmentation and Classification”, In IEEE Transactions on Speech and Audio Processing, vol. 9, No. 4, May 2001, pp. 441-457.

Zsombori, V., et al., “Automatic Generation of Video Narratives from Shared UGC”, In Proceedings of the 22nd ACM Conference on Hypertext and Hypermedia (HH ’11), Eindhoven, NL, Jun. 6-9, 2011, pp. 325-334.

* cited by examiner

SYSTEMS, METHODS, AND MEDIA FOR IDENTIFYING MATCHING AUDIO

CROSS REFERENCE TO RELATED APPLICATION

This application claims the benefit of U.S. Provisional Patent Application No. 61/250,096 filed Oct. 9, 2009, which is hereby incorporated by reference herein in its entirety.

STATEMENT REGARDING FEDERALLY SPONSORED RESEARCHED OR DEVELOPMENT

This invention was made with government support under Grant No. 0716203 awarded by the National Science Foundation. The government has certain rights to the invention.

TECHNICAL FIELD

The disclosed subject matter relates to systems, methods, and media for identifying matching audio.

BACKGROUND

Audio and audio-video recordings and electronically generated audio and audio-video files are ubiquitous in the digital age. Such pieces of audio and audio-video can be captured with a variety of electronic devices including tape recorders, MP3 player/recorders, video recorders, mobile phones, digital cameras, personal computers, digital audio recorders, and the like. These pieces of audio and audio-video can easily be stored, transported, and distributed through digital storage devices, email, Web sites, etc.

There are many examples of sounds which may be heard multiple times in the same recording, or across different recordings. These are easily identifiable to a listener as instances of the same sound, although they may not be exact repetitions at the waveform level. The ability to identify recurrences of perceptually similar sounds has applications in a number of audio and/or audio-video recognition and classification tasks.

With the proliferation of audio and audio-video recording devices and public sharing of audio and audio-video footage, there is an increasing likelihood of having access to multiple recordings of the same event. Manually discovering these alternate recordings, however, can be difficult and time consuming. Automatically discovering these alternate recordings using visual information (when available) can be very difficult because different recordings are likely to be taken from entirely different viewpoints and thus have different video content.

SUMMARY

Systems, methods, and media for identifying matching audio are provided. In some embodiments, systems for identifying matching audio are provided, the systems comprising: a processor that: receives a first piece of audio content; identifies a first plurality of atoms that describe at least a portion of the first piece of audio content using a Matching Pursuit algorithm; forms a first group of atoms from at least a portion of the first plurality of atoms, the first group of atoms having first group parameters; forms at least one first hash value for the first group of atoms based on the first group parameters; compares the at least one first hash value with at least one second hash value, wherein the at least one second hash value is based on second group parameters of a second group of atoms associated with a second piece of audio content; and identifies a match between the first piece of audio content and the second piece of audio content based on the comparing.

In some embodiments, methods for identifying matching audio are provided, the methods comprising: receiving a first piece of audio content; identifying a first plurality of atoms that describe at least a portion of the first piece of audio content using a Matching Pursuit algorithm; forming a first group of atoms from at least a portion of the first plurality of atoms, the first group of atoms having first group parameters; forming at least one first hash value for the first group of atoms based on the first group parameters; comparing the at least one first hash value with at least one second hash value, wherein the at least one second hash value is based on second group parameters of a second group of atoms associated with a second piece of audio content; and identifying a match between the first piece of audio content and the second piece of audio content based on the comparing.

In some embodiments, computer-readable media containing computer-executable instructions that, when executed by a processor, cause the processor to perform a method for identifying matching audio are provided, the method comprising: receiving a first piece of audio content; identifying a first plurality of atoms that describe at least a portion of the first piece of audio content using a Matching Pursuit algorithm; forming a first group of atoms from at least a portion of the first plurality of atoms, the first group of atoms having first group parameters; forming at least one first hash value for the first group of atoms based on the first group parameters; comparing the at least one first hash value with at least one second hash value, wherein the at least one second hash value is based on second group parameters of a second group of atoms associated with a second piece of audio content; and identifying a match between the first piece of audio content and the second piece of audio content based on the comparing.

DETAILED DESCRIPTION

In some embodiments, matching audio can be identified by first identifying atoms that describe one or more portions of the audio. In some embodiments, these atoms can be Gabor atoms or any other suitable atoms. These atoms can then be pruned so the unimportant atoms are removed from subsequent processing in some embodiments. Groups of atoms, such as pairs, can next be formed. These groups of atoms may define a given sound at a specific instance in time. Hashing, such as locality sensitive hashing (LSH), can next be performed on group parameters of each group (such as center frequency for each atom in the group and difference in time for pairs of atoms in the group). The hash values produced by this hashing can next be used to form bins of groups of atoms and a hash table for each bin. These hash tables can then be stored in a database and used for subsequent match searching on the same audio source (e.g., the same audio file), a different audio source (e.g., different audio files), and/or the same and/or a different audio-video source (e.g., a video with a corresponding audio component). The hash tables for each bin can then be searched to identify matching (identical and/or similar) groups of atoms in the same bin. Matching groups can then be identified as matching audio in the audio and/or audio-video sources.

Figure 1:
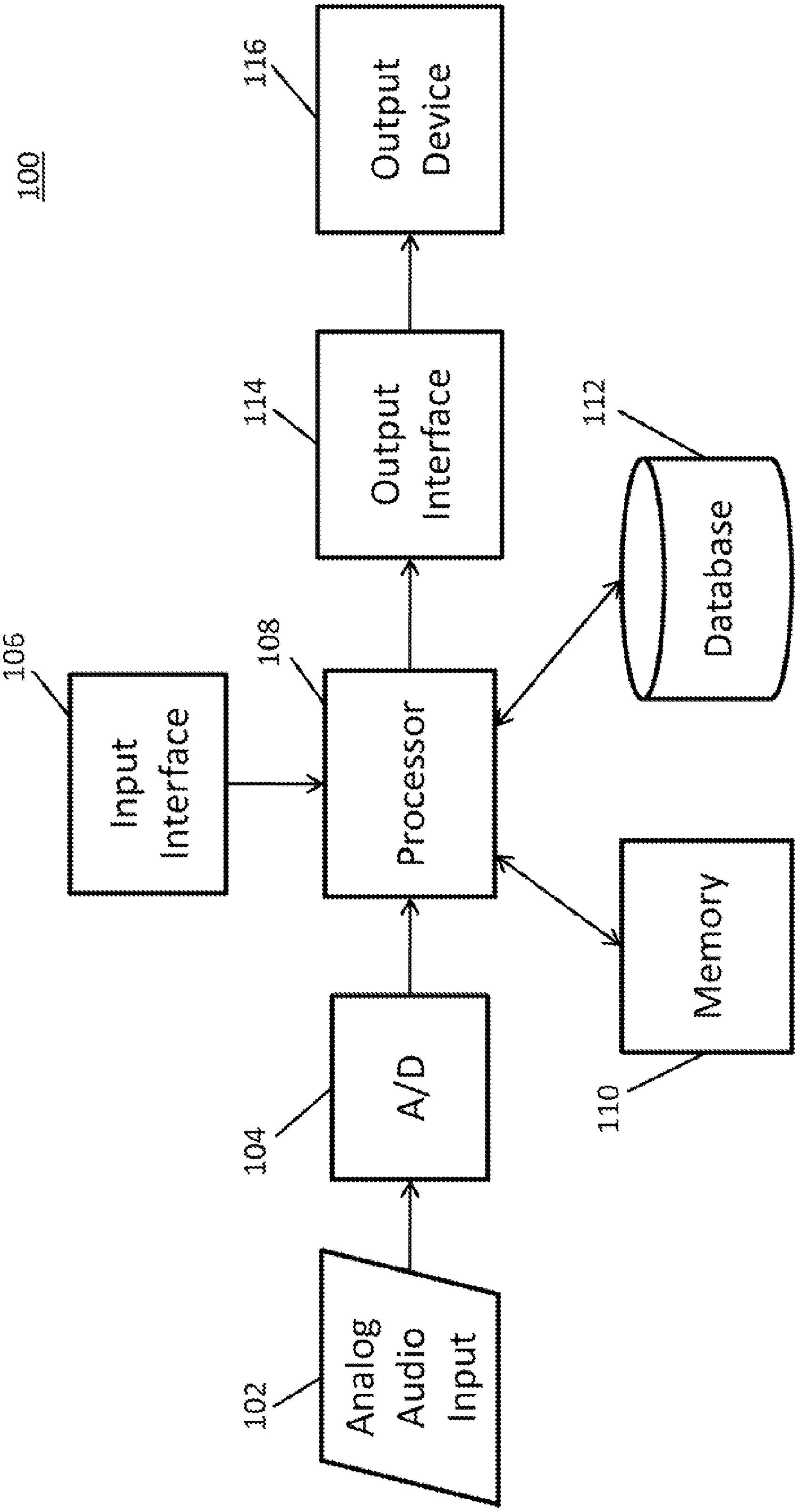
FIG. 1 is a diagram of hardware that can be used in accordance with some embodiments.

FIG. 1 illustrates an example of hardware 100 that can be used to implement some embodiments of the present invention. As shown, hardware 100 can include an analog audio input 102, an analog-to-digital converter 104, an input interface 106, a processor 108, memory 110, a database 112, an output interface 114, and an output device 116. Analog audio input 102 can be any suitable input for receiving audio, such as a microphone, a microphone input, a line- in input, etc. Analog-to-digital converter 104 can be any suitable converter for converting an analog signal to digital form, and can include a converter having any suitable resolution, sampling rate, input amplitude range, etc. Input interface 106 can be any suitable input interface for receiving audio content in a digital form, such as a network interface, a USB interface, a serial interface, a parallel interface, a storage device interface, an optical interface, a wireless interface, etc. Processor 108 can include any suitable processing devices such as computers, servers, microprocessors, controllers, digital signal processors, programmable logic devices, etc. Memory 110 can include any suitable computer readable media, such as disk drives, compact disks, digital video disks, memory (such as random access memory, read only memory, flash memory, etc.), and/or any other suitable media, and can be used to store instructions for performing the process described below in connection with FIG. 2. Database 112 can include and suitable hardware and/or software database for storing data. Output interface 114 can include any suitable interface for providing data to an output device, such as a video display interface, a network interface, an amplifier, etc Finally, output device 116 can include any suitable device for output data and can include display screens, network devices, electro-mechanical devices (such as speakers), etc.

Hardware 100 can be implemented in any suitable form. For example, hardware 100 can be implemented as a Web server that receives audio/audio-video from a user, analyzes the audio/audio-video, and provides identifiers for matching audio/audio-video to the user. As other examples, hardware 100 can be implemented as a user computer, a portable media recorder/player, a camera, a mobile phone, a tablet computing device, an email device, etc. that receives audio/audio-video from a user, analyzes the audio/audio-video, and provides identifiers for matching audio/audio-video to the user.

Figure 2:
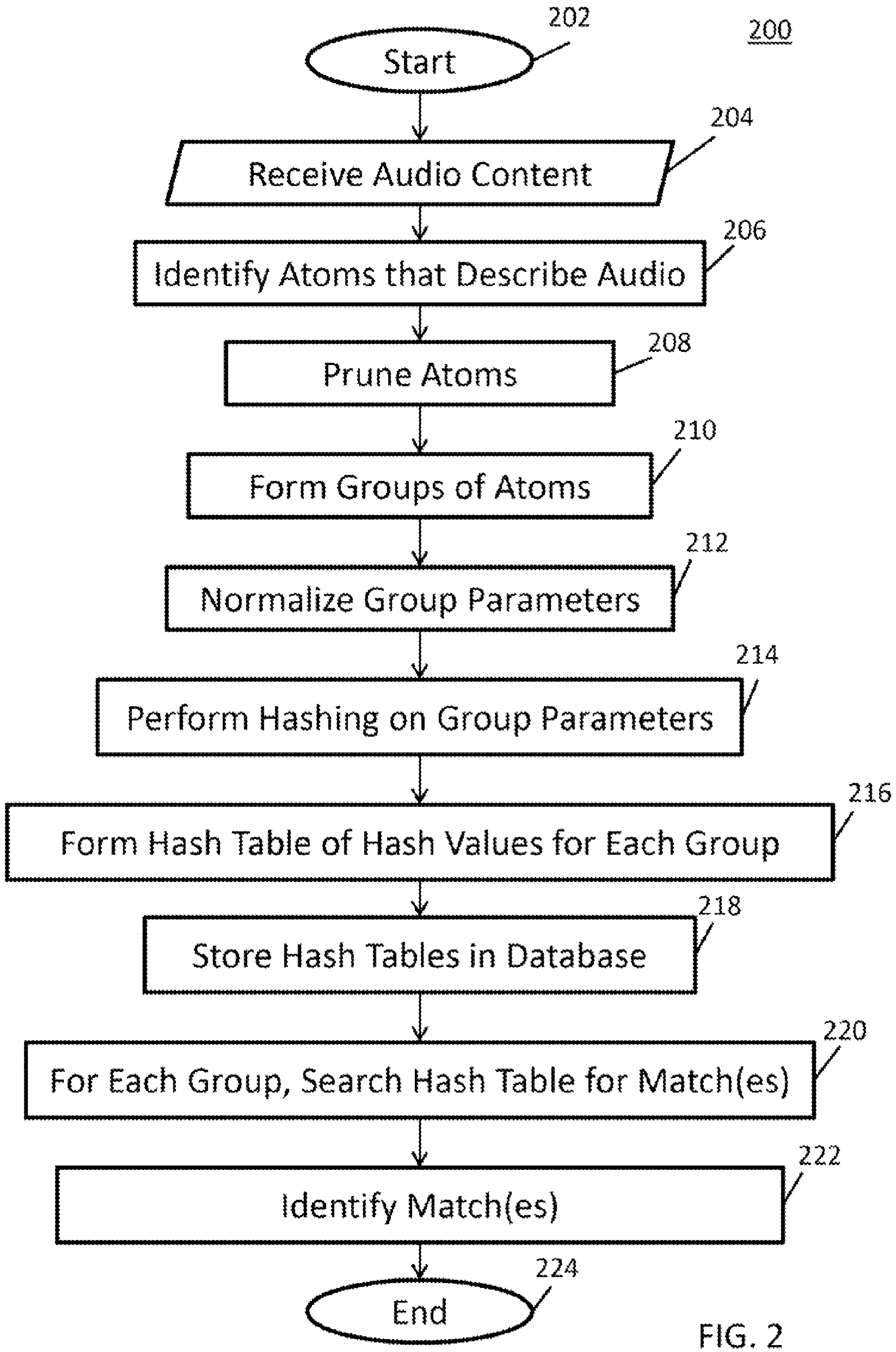
FIG. 2 is a diagram of a process for identifying matching sounds that can be used in accordance with some embodiments.

Turning to FIG. 2, an example of a process 200 for identifying repeating or closely similar sounds in accordance with some embodiments is illustrated. As shown, after process 200 begins at 202, the process can receive audio content at 204. This audio content can include any suitable content. For example, this audio content can contain multiple instances of the same or a closely similar sound, and/or include one or more sounds that match sounds in another piece of audio and/or audio-video content.

This audio content can be received in any suitable manner. For example, the audio content can be received in digital format as a digital file (e.g., a ".MP3" file, a ".WAV" file, etc.), as a digital stream, as digital content in a storage device (e.g., memory, a database, etc.), etc. As another example, the audio content can be received as an analog signal, which is then converted to digital format using an analog to digital converter. Such an analog signal can be received through a microphone, a line-in input, etc. In some embodiments, this audio content can be included with, or be part of, audio-video content (e.g., in a ".MPG" file, a ".WMV" file, etc.).

Next, at 206, process 200 can identify atoms that describe the audio content. Any suitable atoms can be used. A set of atoms can be referred to as a dictionary, and each atom in the dictionary can have associated dictionary parameters that define, for example, the atom's center frequency, length scale, translation, and/or any other suitable characteristic(s).

In some embodiments, these atoms can be Gabor atoms. As is known in the art, Gabor atoms are Gaussian-windowed-sinusoid functions that correspond to concentrated bursts of energy localized in time and frequency, but span a range of time-frequency tradeoffs, and that can be used to describe an audio signal. Any suitable Gabor atoms can be used in some embodiments. For example, in some embodiments, long Gabor atoms, with narrowband frequency resolution, and short Gabor atoms (well-localized in time), with wideband frequency coverage, can be used. As another example, in some embodiments, a dictionary of Gabor atoms that can be used can contain atoms at nine length scales, incremented by powers of two. For data sampled at 22.05 kHz, this corresponds to lengths ranging from 1.5 to 372 ms. These lengths can each be translated by increments of one eighth of the atom length over the duration of the signal.

As another example, in some embodiments, atoms based on time-asymmetric windows can be used. In comparison to a Gabor atom, an asymmetric window may make a better match to transient or resonant sounds, which often have a fast attack and a longer, exponential decay. There are many ways to parameterize such a window, for instance by calculating a Gaussian window on a log-time axis:

$$e(t)=e^{-k((log(t-t_0))^2)}$$

where $t_0$ sets the time of the maximum of the envelope, and k controls its overall duration, and where a longer window will be increasingly asymmetric.

Atoms can be identified at 206 using any suitable technique in some embodiments. For example, in some embodiments, atoms can be identified using a Matching Pursuit algorithm, such as is embodied in the Matching Pursuit Toolkit, available from R. Gribonval and S. Krstulovic, MPTK, The Matching Pursuit Toolkit, http://mptk.irisa.fr/. When using a Matching Pursuit algorithm, atoms can be iteratively selected in a greedy fashion to maximize the energy that they would remove from the audio content received at 204. This iterative selection may then result in a sparse representation of the audio content. The atoms selected in this way can be defined by their dictionary parameters (e.g., center frequency, length scale, translation) and by audio signal parameters of the audio signal being described (e.g., amplitude, phase).

Any suitable number of atoms can be selected in some embodiments. For example, in some embodiments, a few hundred atoms can be selected per second.

After identifying atoms at 206, process 200 can then prune the atoms at 208 in some embodiments.

When atoms are selected using a greedy algorithm (such as the Matching Pursuit algorithm), the first, highest-energy atom selected for a portion of the audio content is the most locally descriptive atom for that portion of the audio content. Subsequent, lower-energy atoms that are selected are less locally descriptive and are used to clean-up imperfections in the description provided by earlier, higher-energy atoms. However, such subsequent, lower-energy atoms are often redundant of earlier, higher-energy atoms in terms of describing key time-frequency components of the audio content. Moreover, because the limitations of human hearing can cause the perceptual prominence provided by a burst of energy to be only weakly related to local energy, lower energy atoms close in frequency to higher-energy atoms may be entirely undetectable by human hearing. Such lower-energy atoms thus need not be included to describe the audio content in some embodiments.

A related effect is that of temporal masking, which perceptually masks energy close in frequency and occurring shortly before (backward masking) or after (forward masking) a higher-energy signal. Typically, such forward masking has a longer duration, while such backward masking is negligible.

In order to reduce the number of atoms used to describe the audio content (and hence improve storage and processing performance statistics) while retaining the perceptually important elements, the atoms selected at 206 can be pruned based on psychoacoustic masking principles in some embodiments.

For example, in some embodiments, masking surfaces in the time-frequency plane, based on the higher-energy atoms, can be created in some embodiments. These masking surfaces can be created with center frequencies and peak amplitudes that match those of corresponding atoms, and the amplitudes of these masks can fall-off from the peak amplitudes with frequency difference. In some embodiments, this fall-off in frequency can be Gaussian on log frequency that is matched to measured perceptual sensitivities of typical humans. Additionally, in some embodiments, the masking curves can persist while decaying for a brief time (around 100 ms) to provide forward temporal masking. This masking curve can fall-off in time in an exponential decay in some embodiments. Reverse temporal masking can also be provided in some embodiments. This reverse temporal masking can be exponential in some embodiments.

Atoms with amplitudes that fall below this masking surface can thus be pruned because they may be too weak to be perceived in the presence of their stronger neighbors. This can have the effect of only retaining the atoms with the highest perceptual prominence relative to their local time-frequency neighborhood.

Next, at 210, groups of atoms can be formed. Any suitable approach to grouping atoms can be used, and any suitable number of groups of atoms can be formed, in some embodiments.

In some embodiments, prior to forming groups of atoms, audio content can be split into sub-portions of any suitable length. For example, the sub-portions can be five seconds (or any other suitable time span) long. This can be useful when looking for multiple similar sounds in multiple pieces of audio-video content, for example.

For example, atoms whose centers fall within a relatively short time window of each other can be grouped. In some embodiments, this relatively short time window can be 70 ms wide (or any other suitable amount of time, which can be based on application). In this example, any suitable number of atoms can be used to form a group in some embodiments. For example, in some embodiments, two atoms can be used to form a pair of atoms.

As another example of an approach to grouping atoms, in some embodiments, for every block of 32 time steps (around one second when each time step is 32 ms long), the 15 highest energy atoms can be selected to each form a group of atoms. Each of these atoms can be grouped with other atoms only in a local target area of the frequency-time plane of the atom. For example, each atom can be grouped with up to three others atoms. If there are more than three atoms in the target area, the closest three atoms in time can be selected. The target area can be any suitable size in some embodiments. For example, in some embodiments, the target area can be defined as the frequency of the initial atom in a group, plus or minus 667 Hz, and up to 64 time steps after the initial atom in the group.

Each group can have associated group parameters. Such group parameters can include, for example, the center frequency of each atom in the group, and the time spacing between each pair of atoms in the group. In some embodiments, bandwidth data, atom length, amplitude difference between atoms in the group, and/or any other suitable characteristic can also be included in the group parameters. In some embodiments, the energy level of atoms can be included or excluded from the group parameters. By excluding the energy level of atoms from the group parameters, variations in energy level and channel characteristics can be prevented from impacting subsequent processing. In some embodiments, these values of these group parameters can be quantized to allow efficient matching between groups of atoms. For example, in some embodiments, the time resolution can be quantized to 32 ms intervals, and the frequency resolution can be quantized to 21.5 Hz, with only frequencies up to 5.5 kHz considered (which can result in 256 discrete frequencies).

In some embodiments, groups of atoms having one or more common atom can be merged to form larger groups of atoms.

The group parameters for each group can next be normalized at 212. In some embodiments, such normalization can be performed by calculating the mean and standard deviation of each of the group parameters across all groups of atoms, and then subtracting these mean and variance estimates from the corresponding group parameter values in each group.

Then one or more hash values can be formed for each group based on the group parameters at 214. The hash values can be formed using any suitable technique. For example, in some embodiments, locality sensitive hashing (LSH) can be performed on the group parameters for each of the groups at 214. LSH makes multiple random normalized projections of the group parameters onto a one-dimensional axis as hash values. Groups of atoms that lie within a certain radius in the original space (e.g., the frequency-time space) will fall within that distance in the hash values formed by LSH, whereas distant groups of atoms in the original space will have only a small chance of falling close together in the projections.

As another example of a technique for forming hash values at 214, in some embodiments, for each group, a hash value can be formed from a hash of 20 bits: eight bits for the frequency of the first atom, six bits for the frequency difference between them, and six bits for the time difference between the atoms.

Next, at 216, the hash values can be quantized into bins (such that near neighbors will tend to fall into the same quantization bin) and a hash table is formed for each bin so that each hash value in that bin is an index to an identifier for the corresponding group of atoms. The identifier can be any suitable identifier. For example, in some embodiments, the identifier can be an identification number from the originating audio/audio-video and a time offset value, which can be the time location of the earliest atom in the corresponding group relative to the start of the audio/audio-video.

In some embodiments using LSH at 214, by using multiple hash values formed by LSH to bin groups of atoms at 216, risks associated with chance co-occurrences (e.g., due to unlucky projections) and nearby groups of atoms straddling a quantization boundary can be averaged out.

These hash tables can then be stored in a database (or any other suitable storage mechanism) at 218. This database can also include hash tables previously stored during other iterations of process 200 for other audio/audio-video content.

At 220, the hash tables in the database can next be queried with the hash value for each group of atoms in that table (each a query group of atoms) to identify identical or similar groups of atoms. Each identical or similar group of atoms may be a repetition of the same sound or a similar sound. Identical or similar groups of atoms can be identified as groups having the same hash values or hash values within a given range from the hash value being searched. This range can be determined manually, or can be automatically adjusted so that a given number of matches are found (e.g., when it is known that certain audio content contains a certain number of repetitions of the same sound). In some embodiment, this range can be 0.085 when LSH hashing is used, or any other suitable value. Identical or similar groups of atoms and corresponding query groups of atoms can be referred to as matching groups of atoms.

In some embodiments, two or more matching groups of sounds can be statistically analyzed across multiple pieces of audio and/or audio-video content to determine if the matching groups are frequently found together. In some embodiments, the criteria for identifying matches (e.g., the range of hash values that will qualify as a match) for a certain group of atoms can be modified (e.g., increased or decreased) based on the commonality of those groups of atoms in generic audio/audio-video, audio/audio-video for a specific event type, etc.

In some embodiments, for example, when the techniques described herein are used to match two or more pieces of audio-video based on audio content associated with those pieces of audio-video, the time difference ($t_{G1}-t_{G2}$) between a group of atoms (G1) in a first piece of audio and a matching group of atoms (G2) in a second piece of audio can be compared to the time difference ($t_{G3}-t_{G4}$) of one or more other matching pairs of groups (G3 and G4) of atoms in the first piece of audio and the second piece of audio. Identical or similar time differences (e.g., $t_{G1}-t_{G2}\approx t_{G3}-t_{G4}$) can be indicative of multiple portions of the audio/audio-video that match between two sources. Such indications can reflect a higher probability of a true match between the two sources. In some embodiments, multiple matching portions of the audio/audio-video that have the same time difference can be merged and be considered to be the same portion.

In some embodiments, matches between two audio/audio-video sources can be determined based on the percentage of groups of atoms in a query source that match groups of atoms in another source. For example, when 5% , 15% , or any suitable number of groups of atoms in a query source match groups of atoms in another source, the two sources can be considered a match.

In some embodiments, a match between two sources of audio/audio-video can be ignored when all, or substantially all, of the matching groups of atoms between those sources occur in the same hash bin.

In some embodiments, the techniques for identifying matching audio in audio-audio-video can be used for any suitable application. For example, in some embodiments, these techniques can be used to identify a repeating sound in a single piece of audio (e.g., a single audio file). As another example, in some embodiments, these techniques can be used to identify an identical or similar sound in two or more pieces of audio (e.g., two or more audio files). As still another example, in some embodiments, these techniques can be used to identify an identical or similar sound in two or more pieces of audio-video (e.g., two or more audio-video files). As yet another example, in some embodiments, these techniques can be used to identify two or more pieces of audio and/or audio-video as being recorded at the same event based on matching audio content in the pieces. Such pieces may be made available on a Web site. Such pieces may be made available on an audio-video sharing Web site, such as YOUTUBE.COM. Such pieces may include a speech portion. Such pieces may include a music portion. Such pieces may be of a public event.

In some embodiments, any suitable computer readable media can be used for storing instructions for performing the functions described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for identifying matching audio comprising:

a processor that:

receives a first piece of audio content;

identifies a first plurality of atoms that describe at least a portion of the first piece of audio content using a Matching Pursuit algorithm;

forms a first group of atoms from at least a portion of the first plurality of atoms, the first group of atoms having first group parameters;

forms at least one first hash value for the first group of atoms based on the first group parameters;

compares the at least one first hash value with at least one second hash value, wherein the at least one second hash value is based on second group parameters of a second group of atoms associated with a second piece of audio content; and identifies a match between the first piece of audio content and the second piece of audio content based on the comparing.

2. The system of claim 1, wherein the first piece of audio content and the second piece of audio content are from a single recording.

3. The system of claim 1, wherein the first piece of audio content and the second piece of audio content are each associated with audio-video content.

4. The system of claim 1, wherein the first piece of audio content is received in digital form.

5. The system of claim 1, wherein the first piece of audio content is received in analog form.

6. The system of claim 1, wherein the first plurality of atoms are Gabor atoms.

7. The system of claim 1, wherein the process also prunes the first plurality of atoms after identifying the first plurality of atoms and before forming of the first group of atoms.

8. The system of claim 7, wherein pruning is based on at least one mask.

9. The system of claim 1, wherein forming the at least one first hash value is performed using locality sensitive hashing.

10. The system of claim 1, wherein the processor also quantizes the at least one first hash value.

11. A method for identifying matching audio comprising:
- receiving a first piece of audio content;
- identifying a first plurality of atoms that describe at least a portion of the first piece of audio content using a Matching Pursuit algorithm;
- forming a first group of atoms from at least a portion of the first plurality of atoms, the first group of atoms having first group parameters;
- forming at least one first hash value for the first group of atoms based on the first group parameters;
- comparing the at least one first hash value with at least one second hash value, wherein the at least one second hash value is based on second group parameters of a second group of atoms associated with a second piece of audio content; and
- identifying a match between the first piece of audio content and the second piece of audio content based on the comparing.

12. The method of claim 11, wherein the first piece of audio content and the second piece of audio content are from a single recording.

13. The method of claim 11, wherein the first piece of audio content and the second piece of audio content are each associated with audio-video content.

14. The method of claim 11, wherein the first piece of audio content is received in digital form.

15. The method of claim 11, wherein the first piece of audio content is received in analog form.

16. The method of claim 11, wherein the first plurality of atoms are Gabor atoms.

17. The method of claim 11, further comprising pruning the first plurality of atoms after the identifying of the first plurality of atoms and before the forming of the first group of atoms.

18. The method of claim 17, wherein the pruning is based on at least one mask.

19. The method of claim 11, wherein the forming of the at least one first hash value is performed using locality sensitive hashing.

20. The method of claim 11, further comprising quantizing the at least one first hash value.

21. A non-transitory computer-readable medium containing computer-executable instructions that, when executed by a processor, cause the processor to perform a method for identifying matching audio, the method comprising:
- receiving a first piece of audio content;
- identifying a first plurality of atoms that describe at least a portion of the first piece of audio content using a Matching Pursuit algorithm;
- forming a first group of atoms from at least a portion of the first plurality of atoms, the first group of atoms having first group parameters;
- forming at least one first hash value for the first group of atoms based on the first group parameters;
- comparing the at least one first hash value with at least one second hash value, wherein the at least one second hash value is based on second group parameters of a second group of atoms associated with a second piece of audio content; and
- identifying a match between the first piece of audio content and the second piece of audio content based on the comparing.

22. The non-transitory computer-readable medium of claim 21, wherein the first piece of audio content and the second piece of audio content are from a single recording.

23. The non-transitory computer-readable medium of claim 21, wherein the first piece of audio content and the second piece of audio content are each associated with audio-video content.

24. The non-transitory computer-readable medium of claim 21, wherein the first piece of audio content is received in digital form.

25. The non-transitory computer-readable medium of claim 21, wherein the first piece of audio content is received in analog form.

26. The method of claim 21, wherein the first plurality of atoms are Gabor atoms.

27. The non-transitory computer-readable medium of claim 21, wherein the method further comprises pruning the first plurality of atoms after the identifying of the first plurality of atoms and before the forming of the first group of atoms.

28. The non-transitory computer-readable medium of claim 27, wherein the pruning is based on at least one mask.

29. The non-transitory computer-readable medium of claim 21, wherein the forming of the at least one first hash value is performed using locality sensitive hashing.

30. The non-transitory computer-readable medium of claim 21, wherein the method further comprises quantizing the at least one first hash value.

* * * * *